United States Patent
Boldt et al.

(10) Patent No.: US 6,954,717 B2
(45) Date of Patent: Oct. 11, 2005

(54) DEVICE FOR DETERMINING AND/OR MONITORING A PROCESS VARIABLE

(75) Inventors: Matthias Boldt, Lörrach (DE); Frank Erdmann, Waldkirch (DE); Klaus Pankratz, Kandern (DE); Bert Von Stein, Waldkirch (DE); Dietmar Spanke, Steinen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 63 days.

(21) Appl. No.: 10/399,980

(22) PCT Filed: Oct. 20, 2001

(86) PCT No.: PCT/EP01/12152

§ 371 (c)(1),
(2), (4) Date: Aug. 20, 2003

(87) PCT Pub. No.: WO02/37061

PCT Pub. Date: May 10, 2002

(65) Prior Publication Data

US 2004/0030532 A1 Feb. 12, 2004

(30) Foreign Application Priority Data

Oct. 24, 2000 (DE) .................................. 100 52 836

(51) Int. Cl.⁷ ............................................... G01P 15/00
(52) U.S. Cl. ...................... 702/187; 702/130; 702/138; 702/141; 702/176; 73/488; 73/496
(58) Field of Search ................................ 702/130, 138, 702/141, 176, 187–189; 73/488, 496, 602, 627, 861.18, 861.21

(56) References Cited

U.S. PATENT DOCUMENTS

| | | | | |
|---|---|---|---|---|
| 4,210,904 A | * | 7/1980 | Renzel et al. ............... | 341/164 |
| 5,884,231 A | * | 3/1999 | Perdue et al. ................. | 702/28 |
| 6,122,959 A | * | 9/2000 | Hoshal et al. ................ | 73/489 |
| 6,295,874 B1 | * | 10/2001 | Strutt et al. .................... | 73/597 |
| 6,539,794 B1 | * | 4/2003 | Otto et al. ................. | 73/290 V |
| 6,615,091 B1 | * | 9/2003 | Birchenough et al. ......... | 700/96 |
| 2002/0158615 A1 | * | 10/2002 | Goodfellow et al. ........ | 323/315 |
| 2003/0093519 A1 | * | 5/2003 | Jackson et al. ............. | 709/224 |

FOREIGN PATENT DOCUMENTS

| | | | | |
|---|---|---|---|---|
| DE | 19860901 A1 | | 7/2000 | |
| EP | 0346685 A1 | | 12/1989 | |
| EP | 346685 A | * | 12/1989 | ............ A61B/5/04 |
| GB | 2296971 A | | 7/1996 | |
| GB | 2342453 A | | 4/2000 | |

* cited by examiner

*Primary Examiner*—Carol S. W. Tsai
(74) *Attorney, Agent, or Firm*—Bacon & Thomas

(57) ABSTRACT

The invention relates to a device for determining and/or monitoring a process variable. The aim of the invention is to provide a cost-effective, user-friendly device for determining and/or monitoring a process variable. The inventive device comprises the following elements: a sensor, a measuring/regulating/control unit which pre-defines at least one event to be determined or monitored, and at least one memory unit which stores data according to the at least one pre-defined event. The sensor, the measuring/regulating/control unit and the memory unit form a compact unit or an independent field appliance.

12 Claims, 4 Drawing Sheets

DEVICE FOR DETERMINING AND/OR MONITORING A PROCESS VARIABLE

FIELD OF THE INVENTION

This invention relates to an apparatus for determining and/or monitoring a process variable.

BACKGROUND OF THE INVENTION

Prior-art measuring devices for determining and/or monitoring an arbitrary process variable (e.g., level, pressure, temperature, flow rate) in industrial measurement technology are so designed that only the respective current measured value is stored and made available. For diagnostic, error-detection, and predictive-maintenance purposes, however, the provision of the current measured value is very seldom sufficient. For diagnosis and for the detection of incipient faults, it is necessary to record measurement and/or system information over a prolonged period of time, so that it can be retrieved and evaluated when required.

So far it has only become known to connect a so-called data logger to the measuring device proper in case of need. The data logger is capable of recording the measurement data over a desired period of time for future reference. Commonly used data loggers are offered and sold by Endress+Hauser Wetzer GmbH+Co. KG, for example. These data loggers are used, for instance, when a malfunction of the device is presumed. Using the measurement and/or system data recorded by the data logger over time, a fault diagnosis can be carried out. However, before the fault is actually located, much time may pass.

Error detection is particularly difficult if a malfunction occurs only intermittently, for instance at irregular intervals. In that case it may happen that in the current measuring period, in which the data logger is recording measurement and/or system data, the malfunction is not detectable. The measuring device then operates error-free during the recording of the measurement data; it may happen, however, that the malfunction recurs in the near future and, in the extreme case, is not detectable by a second check via the data logger, either.

Thus, the known analysis with the help of a data logger which is connected to the measuring system only from time to time involves the risk that despite a great number of checks, an intermittently occurring malfunction of the measuring device cannot be detected and, consequently, not be corrected. The method employed in the prior art is therefore uneconomical and may even be dangerous in critical applications. An example of a critical application is an intermittently occurring fault in an overfill safeguard mounted in a tank which holds chemicals that are injurious to health.

SUMMARY OF THE INVENTION

An object of the present invention is to provide a low-cost, operator-friendly, and reliable apparatus for determining and/or monitoring a process variable.

This object is attained by an apparatus comprising a sensor, a measuring/control unit which specifies at least one event to be determined or monitored, and at least one memory unit which stores data as a function of the at least one predetermined event. In particular, the sensor, the measuring/control unit, and the memory unit form a compact unit or a self-contained field device. Since the apparatus according to the invention records measurement and system data continuously, arbitrary events can be diagnosed. Such an event is, for example, a temporary or creeping malfunction of the measuring device. As soon as an intermittent malfunction occurs, it can be detected with high reliability on the basis of the recorded data, and corrected. However, as will be explained later, the event may also be the current or time-varying representation of a measured value.

In a further development of the apparatus according to the present invention, the process variable is a fill level, pressure, flow rate, temperature, density, conductivity, or any other physical or chemical quantity to be measured. The event to be determined or monitored is, generally speaking, a predetermined time interval or a predetermined time scheme. Furthermore, again generally speaking, the event to be determined or monitored may be the attainment of a defined measured-value condition or the attainment of a defined system or fault condition.

In a preferred embodiment of the apparatus according to the present invention, both the current measurement and/or system information and the corresponding measurement and/or system information which occurred in a defined previous time range is stored in the memory unit. The latter measurement and system information will hereinafter be referred to as "history data".

To enable the measuring/control unit to exchange data with a remote control station or to communicate with such a station, in a further development of the apparatus according to the present invention, a bus system is provided. For the data exchange, any of the known communications standards can be used, such as the Profibus PA standard or the Fieldbus Foundation standard. In particular, both the current data and the history data are transmitted over the bus system to the remote control station.

In another preferred embodiment of the apparatus according to the present invention, the memory unit for the history data is designed as a removable compact unit. This embodiment makes it possible to use one and the same memory unit for a multitude of measuring devices. This reduces the cost of the apparatus according to the invention. The memory unit in the compact unit may be, for instance an EEPROM, a hard disk, or a volatile memory device.

In a further development of the apparatus according to the present invention, the measuring/control unit has an associated interface via which an input/output unit or the memory unit for the history data is selectively connectable to the measuring/control unit. This development of the invention is particularly advantageous in that a memory unit can be used in conjunction with a great number of apparatuses for determining and/or monitoring a process variable. In a preferred embodiment, the measuring/control unit carries out a fault analysis and/or a cause analysis and/or a prevention analysis using the history data provided by the memory unit, and makes the results of the analyses available to the operating personnel. The analysis data is displayed to the operating personnel on an on-site screen, for example.

Preferably, the output unit is designed to provide a pixel-oriented display of current measurement data, intermediate results, history data, and/or analysis data. In the case of level measurements using a transit-time technique, for example, the current measurement data is conveyed to the operating personnel in the form of a so-called echo curve. The echo curve embodies the amplitudes of the echo signals as a function of transit time or distance travelled. Of course, the display of the current measurement data derived by a transit-time technique also includes the display of a quantity derived from the echo curve. An example is a digital envelope. Typical echo curves are shows in FIGS. 6 and 7.

An interesting application of the display of history data is the temporal variation of the level of a medium in a vessel. By means of the history data, it is also possible, of course, to detect and trace measurement disturbances.

The present invention will now be explained in more detail with reference to the accompanying drawings, in which:

DESCRIPTION OF THE PREFERRED EMBODIMENT

Figure 1:
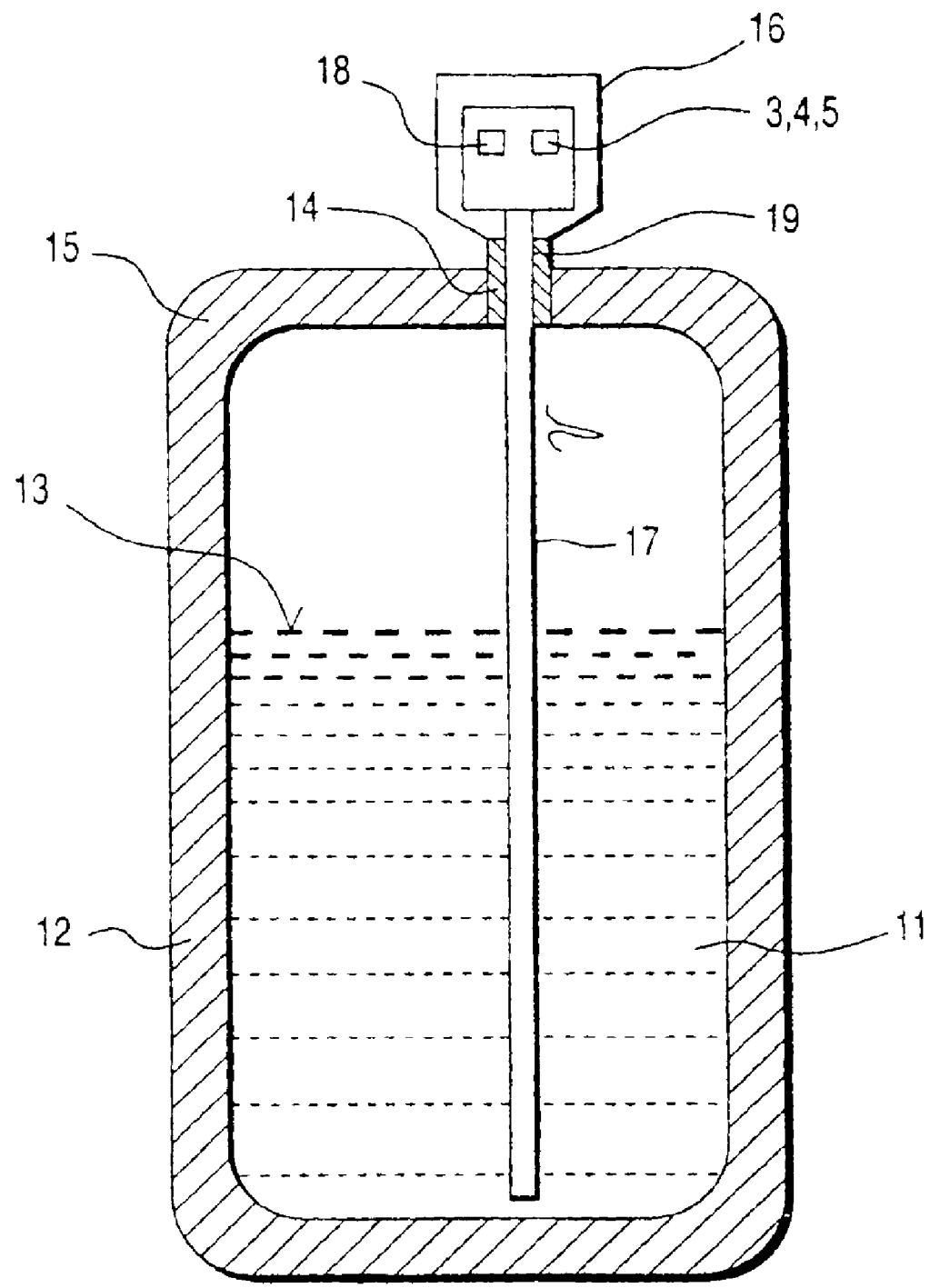
FIG. 1 is a schematic representation of a level-measuring device using the transit-time technique.

FIG. 1 shows schematically a level-measuring device 16. Level-measuring device 16 is mounted in an opening 14 in the lid 15 of the container 12. To determine the level of the medium 11 in the container 12, radio-frequency measurement signals are guided along the surface-wave transmission line 17 into the medium 11. A measurement signal is shown in FIG. 1 as a radio-frequency pulse in stylized form. The measurement signals are generated in the signal-generating unit 18 and coupled through the coupling unit 19 to the surface-wave transmission line 17. The echo signals reflected from the surface 13 of the medium 11 are fed through the coupling unit 19 to the measuring/control unit 3. From the signal transit time and the height of the container 12, the measuring/control unit 3 calculates, among other things, the level of the medium 11 in the container 12.

Figure 2:
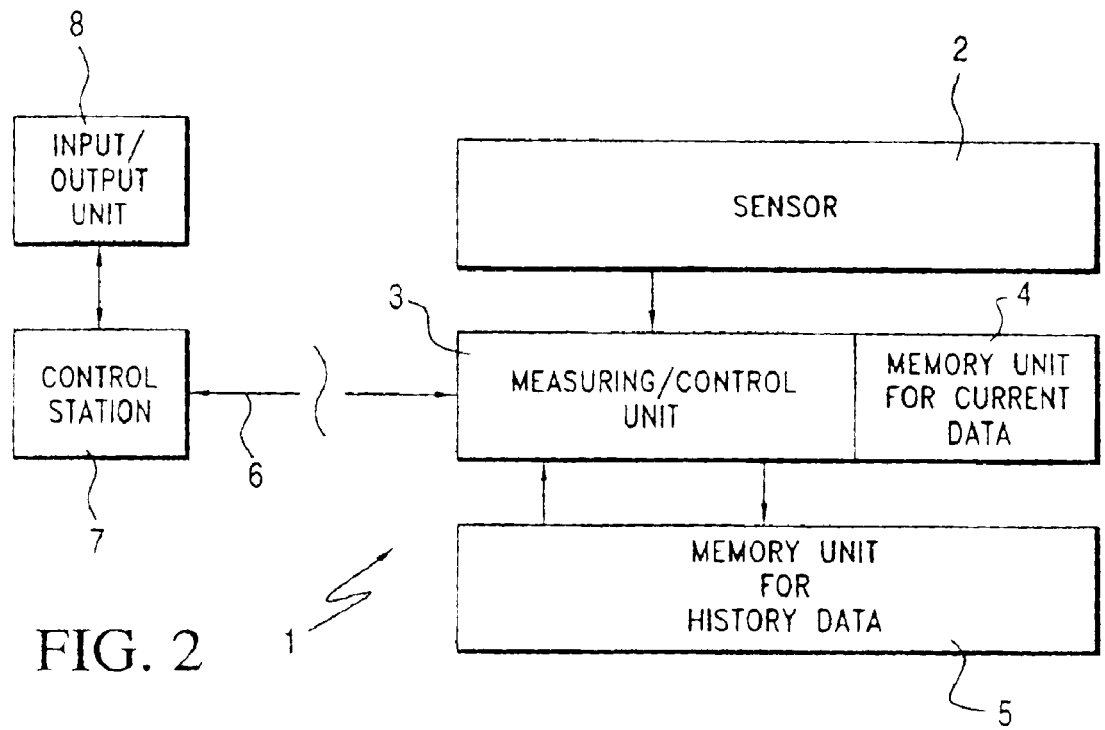
FIG. 2 is a schematic representation of a first embodiment of the apparatus according to the invention.

FIG. 2 shows schematically a first embodiment of the apparatus according to the invention. From the data made available by the sensor 2, for example by the level sensor 16 shown in FIG. 1, the measuring/control unit 3 determines the current measured values, i.e., the current level of the medium 11 in the container 12, for example. The respective current measurement data is stored in the memory unit 4. Over a defined period of time, the respective current measurement data is written into a memory unit for history data 5, the so-called history memory. On the basis of the history data it is possible, for example, to carry out a fault diagnosis or a cause analysis for short- and long-time malfunctions of the level-measuring device. Furthermore, the history data may be used for predictive-maintenance purposes.

In the embodiment shown, the measuring/control unit 3 is connected via a bus system 6 to a remote control station 7. Via the bus system 6, the sensor 2 or the measuring/control unit 3 and the control station 7 communicate with one another. The input/output unit 8 acts as an interface to the operating personnel: Here, data can be read out, new parameters can be entered, etc.

The history data is retrieved from the history memory 5 via the measuring/control unit 3. Therefore, in the embodiment shown in FIG. 2, no additional terminals need be provided on the history memory 5. The terminal may be located at any point of the bus system 6. The embodiment shown in FIG. 2 is suitable for use in hazardous areas, since the communication as such is designed for such use. However, certain disadvantages arise from the fact that in this embodiment, the bus system 6 is additionally loaded by the communication with the history memory 5.

Figure 3:
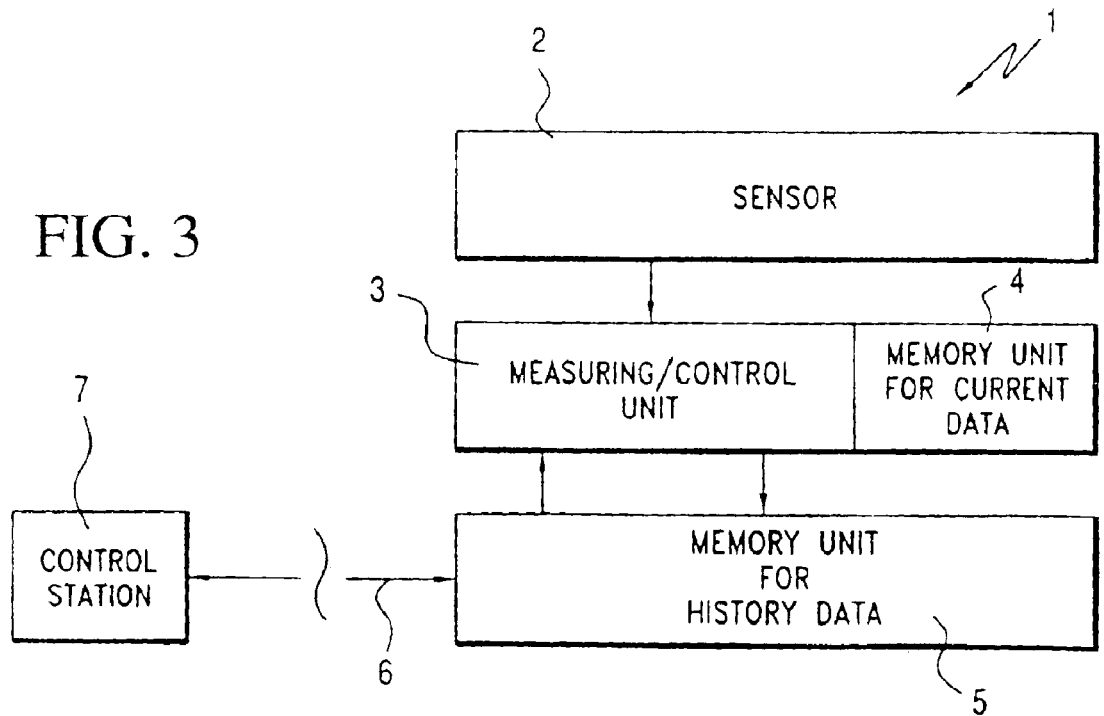
FIG. 3 is a schematic representation of a second embodiment of the apparatus according to the invention.

If the communication is to be speeded up, i.e., if more data is to be transmitted over the bus system 6 per unit time, a second embodiment of the apparatus 1 according to the invention is appropriate, which is shown in FIG. 3. In this embodiment, the history memory 5 communicates with the control station 7 via a separate bus system 6. Thus, the bus system (not shown in FIG. 3) between the measuring/control unit 3 and the control station is not loaded by a superimposed communication with the history memory 5. A disadvantage of this embodiment is, however, that an additional connector socket must be provided; furthermore, additional access to the sensor 2 is necessary. In addition, the apparatus can only be used in hazardous areas if the second bus system 6 is also designed for use in hazardous areas. Faster communication is thus made possible at increased expense.

Figure 4:
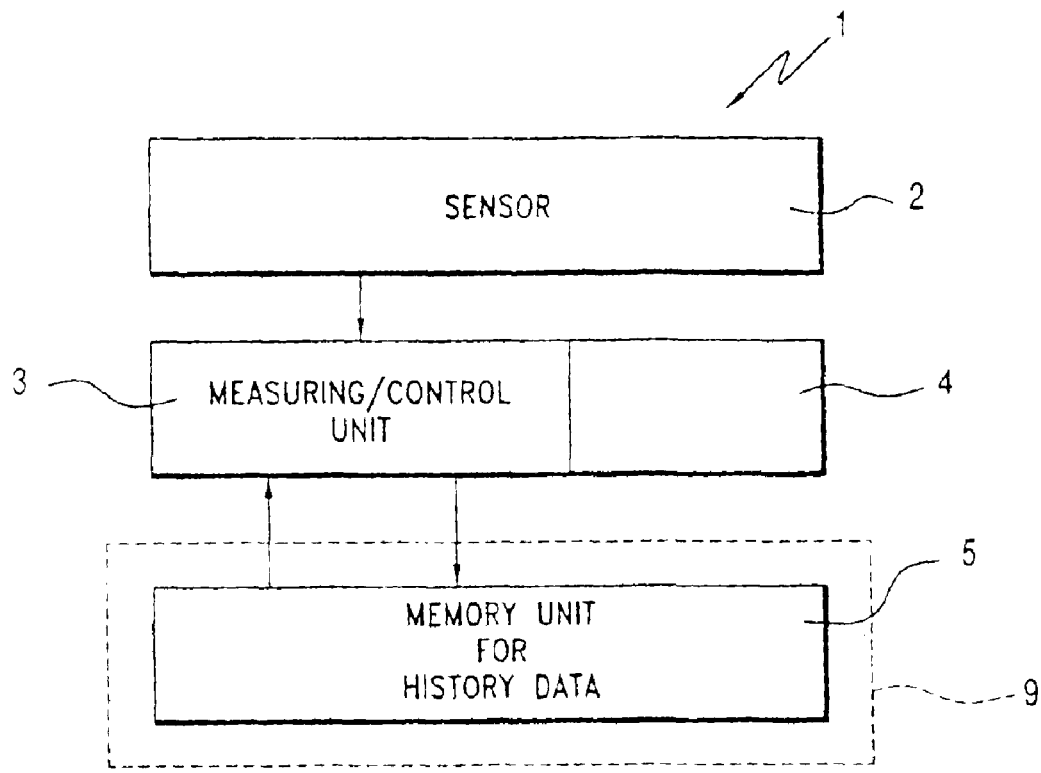
FIG. 4 is a schematic representation of a third embodiment of the apparatus according to the invention.

FIG. 4 shows schematically a third embodiment of the apparatus according to the invention, which can be used if on-line evaluation of the data is not necessary. In this embodiment, the memory unit 5 for history data is designed as a removable compact unit 9. This makes it possible to send recorded data to any location for purposes of evaluation and/or subsequent analysis. Another advantage of this embodiment is that the communication over the bus system 6 is not loaded by the transfer of the history data. It goes without saying that the embodiment of the history memory 5 as a removable compact unit 9 can also be used in conjunction with the other embodiments of the apparatus according to the invention.

Figure 5:
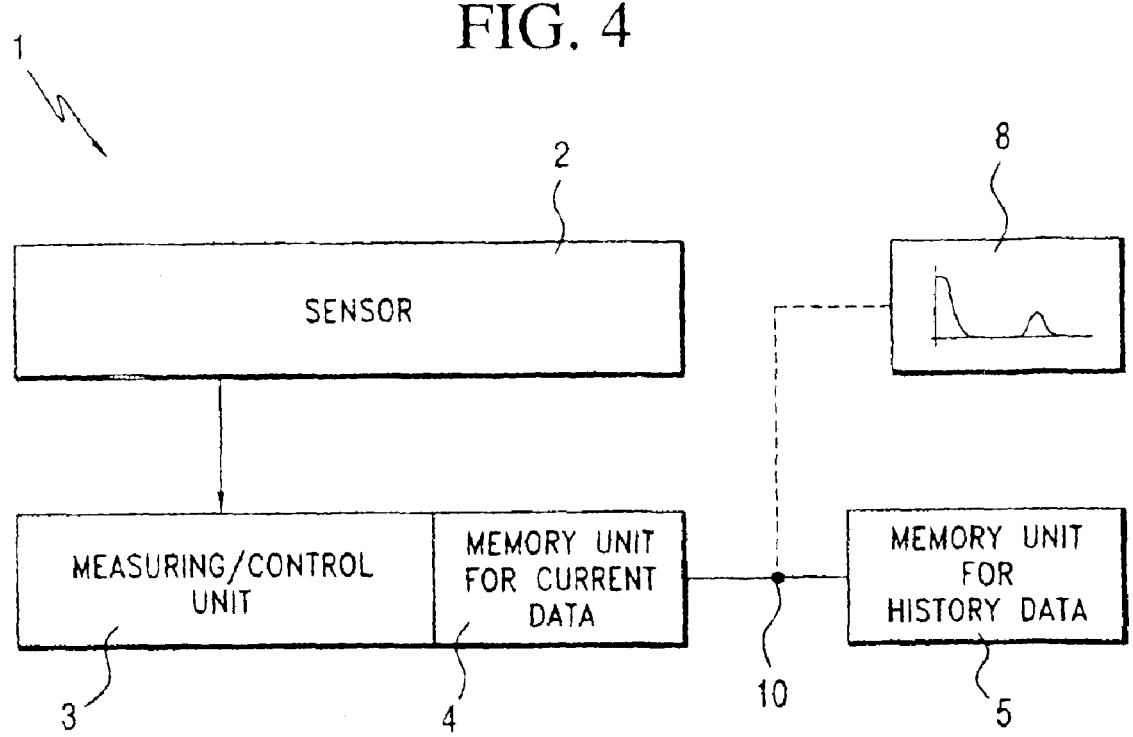
FIG. 5 is a schematic representation of a fourth embodiment of the apparatus according to the invention.

A fourth embodiment of the apparatus according to the invention is shown in FIG. 5. Here, the memory unit 5 for history data or an input/output unit 8, e.g., an on-site display, can be selectively connected to the measuring/control unit 3 via the interface 10. The advantage of this embodiment is that no additional connector socket need be provided for the history memory 5. A minor disadvantage of this embodiment is, however, that simultaneous operation of input/output unit 8 and history memory 5 is not possible.

As stated above, the apparatus according to the invention offers a great number of advantages, particularly with regard to error detection, detection of incipient errors (predictive maintenance), etc. For the first time, however, it also becomes possible to represent measurement data graphically. In particular, the representation of the echo curve should be mentioned, which is evaluated if transit-time techniques are used to determine and/or monitor the level of a material in a container. On an on-site display 8 or at a remote control station 7, the operator can visually follow the changes of the level in a container 12 by observing the shift of the useful-echo signal along the x-axis. This possibility of visualization will increase the operator's confidence in a technology in which level is detected via the transit time of radio-frequency measurement signals or of ultrasonic signals.

Of course, the invention also consists in the fact that the current measurement data is displayed or made available at the input/output unit 8. The current measurement data is preferably the echo curve.

Figure 6:
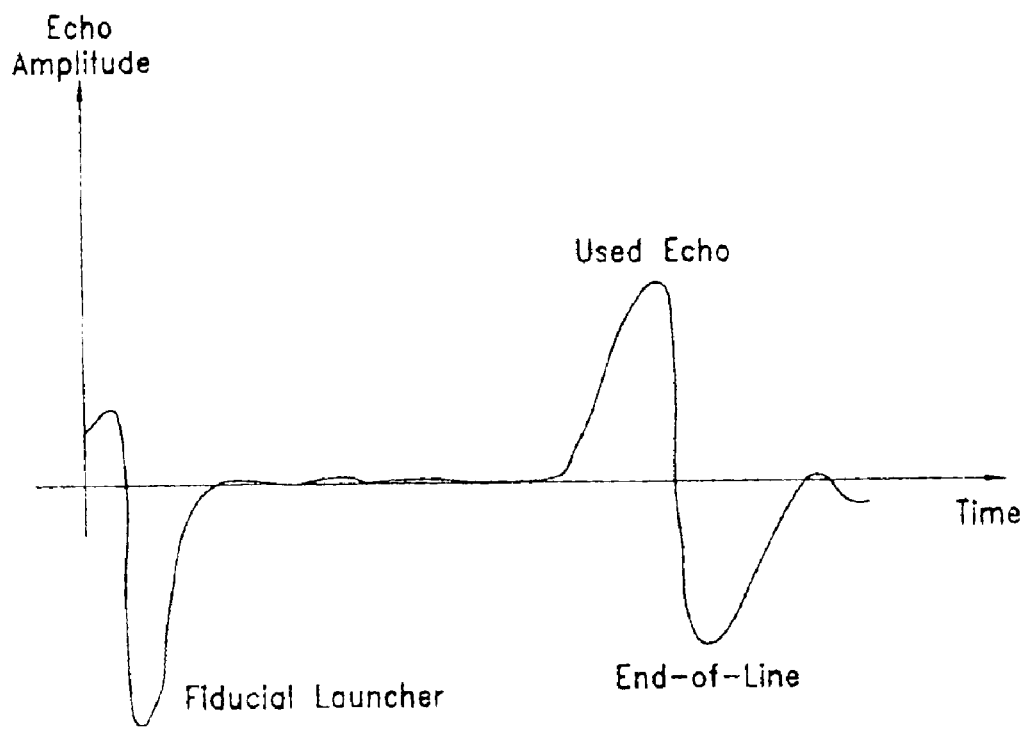
FIG. 6 shows a typical echo curve as is obtained with guided measurement signals.
Figure 7:
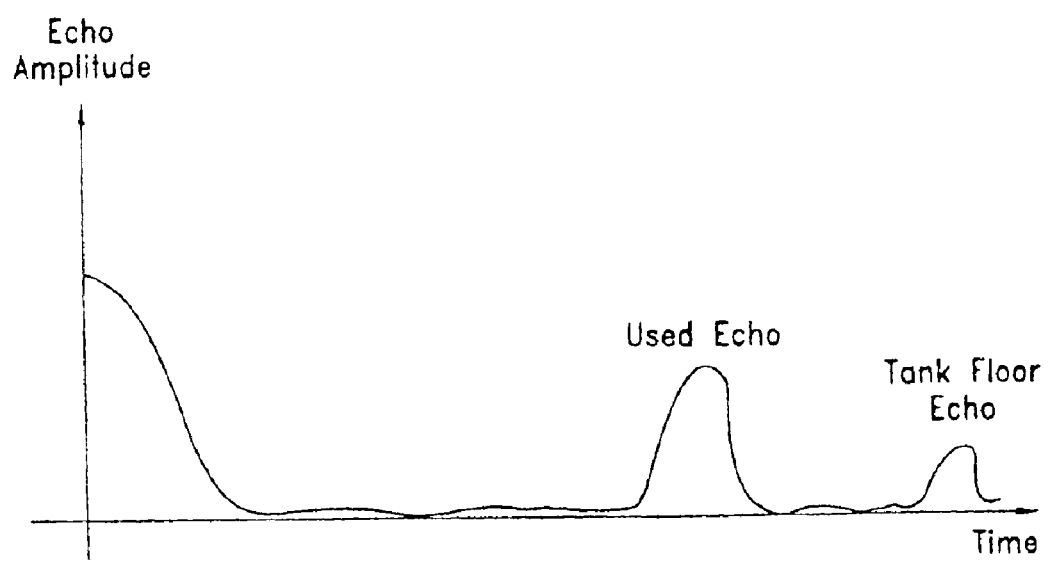
FIG. 7 shows a typical echo curve as is obtained with freely radiated measurement signals.

FIG. 6 shows the typical echo curve of a TDR sensor. The echo curve, as already explained above, represents the echo amplitudes of a measurement signal as a function of the distance travelled by the measurement signal along the surface-wave transmission line 17, or as a function of the corresponding transit time.

The first peak in the immediate vicinity of the origin of coordinates represents the so-called fiducial launcher. This peak is caused by a step change in impedance and a resulting partial reflection of the measurement signal at the interface between the coupling unit 19 and the surface-wave transmission line 17.

The peak that is farthest from the origin is the end-of-line peak, i.e., the peak representing that portion of the measurement signal which is reflected at the free end of the surface-wave transmission line 17. The distinct peak between the fiducial launcher and the end-of-line peak represents the useful-echo signal. The useful-echo signal is a measure of the level of the medium 11 in the container 12. As a result of the step change in impedance between two media—normally, these are air and a solid or liquid material stored in the container 12—a portion of the measurement signal is reflected. From the transit time or the distance which is determined from the separation between a defined starting point and the peak of the useful-echo signal, the level can be determined.

While the fiducial launcher and the end-of-line peak represent system-dependent echo signals which exhibit no dependence on the respective level, the location of the useful-echo signal varies with the respective level: At a low level, the useful-echo signal will move in the direction of the end-of-line peak; as the level rises, the useful-echo signal will move in the direction of the fiducial launcher.

It goes without saying that in the case of freely radiated measurement signals, the end-of-line peak in the echo curve does not occur. However, a peak may occur which is caused by the reflection of the measurement signal from the bottom of the container. In that case, too, the location of the useful-echo signal varies with the level of the medium 11 in the container 12, of course. The peak of the useful-echo signal will therefore move along the x-axis, which represents either the time or the distance travelled. The measurement signals freely radiated via an antenna may be ultrasonic or microwave signals. It is possible, of course, to use level-measuring devices 16 which are based on the pulse transit time technique or the FM-CW technique.

If the current echo curve is displayed on a pixel-oriented output unit 8, a change in level is visually indicated to the operating personnel. In many cases, this will increase the operating personnel's confidence in the measuring device, since a level change is indicated not simply in the form of a change in a numerical value, but by means of a signal which shifts spatially as a function of a varying level.

What is claimed is:

1. An apparatus for determining and/or monitoring the fill level of a medium in a container using a transit-time technique comprising:

a sensor;

a measuring/control unit which specifies at least one event to be determined or monitored;

at least one memory unit which stores data as a function of said at least one specified event and an imput/output unit which provides a pixel-oriented display of a stored and/or current measurement data, wherein:

said display of the current and/or stored measurement data is the display of the echo curve made available or the display of the current measurement data is the display quantity derived from the echo curve, and said sensor, said measuring/control unit, said input/output unit, and said memory unit form a compact unit or a self-contained field device.

2. An apparatus as claimed in claim 1, wherein: said at least one specified event to be determined or monitored is one of: a predetermined time interval, and a predetermined time scheme.

3. An apparatus as claimed in claim 1, wherein: said at least one specified event to be determined or monitored is one of: the attainment of a defined measure-value condition, and the attainment of a defined system or fault condition.

4. An apparatus as claimed in claim 1, wherein:

said memory unit store both the current measurement and/or system information and the corresponding measurement and/or system information that occurred within a defined previous time range (→history data).

5. An apparatus as claimed in claim 1, further comprising: a bus system via which said measuring/control unit or said memory unit communicates with a remote control station.

6. An apparatus as claimed in claim 5, wherein:

both the current data and the history data are transmitted over said bus system to the remote control station.

7. An apparatus as claimed in claim 1, wherein:

said memory unit for the history data is designed as a removable compact unit.

8. An apparatus as claimed in claim 1, wherein:

said measuring/control unit has an associated interface via which an input/output unit or said memory unit for the history data is selectively connectable to said measuring/control unit.

9. An apparatus as claimed in claim 1, wherein:

said measuring/control unit carries out a fault analysis and/or a cause analysis and/or a prevention analysis using the history data made available by said memory unit, and makes the results of the analyses available to operating personnel.

10. An apparatus as claimed in claim 1, wherein: said output unit is designed to provide a pixel-oriented display of current measurement data, intermediate results, history data, and/or analysis data.

11. An apparatus as claimed in claim 10, wherein: said display of the current measurement data is one of: the display of the echo curve made available by a measuring device which determines the level of a medium in a container using a transit-time technique, and the display of the current measurement data is the display a quantity derived from the echo curve.

12. An apparatus as claimed in claim 10, wherein:

said display of history data is the display of the temporal variation of the level of a medium in a container.

* * * * *